US012456590B2

(12) United States Patent
Hammer

(10) Patent No.: US 12,456,590 B2
(45) Date of Patent: Oct. 28, 2025

(54) ON-LOAD TAP CHANGER AND METHOD FOR ACTUATING AN ON-LOAD TAP CHANGER

(71) Applicant: MASCHINENFABRIK REINHAUSEN GMBH, Regensburg (DE)

(72) Inventor: Christian Hammer, Regensburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 366 days.

(21) Appl. No.: 18/044,208

(22) PCT Filed: Aug. 9, 2021

(86) PCT No.: PCT/EP2021/072170
§ 371 (c)(1),
(2) Date: Mar. 7, 2023

(87) PCT Pub. No.: WO2022/053239
PCT Pub. Date: Mar. 17, 2022

(65) Prior Publication Data

US 2024/0029966 A1 Jan. 25, 2024

(30) Foreign Application Priority Data

Sep. 9, 2020 (DE) ..................... 10 2020 123 455.4

(51) Int. Cl.
*H01H 9/00* (2006.01)

(52) U.S. Cl.
CPC ........ *H01H 9/0016* (2013.01); *H01H 9/0027* (2013.01)

(58) Field of Classification Search
CPC ........ H01F 29/00; H01F 29/02; H01F 29/025; H01F 29/04; G05F 1/10; G05F 1/12;
(Continued)

(56) References Cited

U.S. PATENT DOCUMENTS 10,159,524 B2 * 12/2018 Yates ................ H02M 7/53806
2012/0306471 A1 * 12/2012 Green .................. H01H 9/0016
323/355
(Continued)

FOREIGN PATENT DOCUMENTS

DE 102010008973 A1 8/2011
DE 102010024255 A1 12/2011
(Continued)

*Primary Examiner* — Jeffrey A Gblende
(74) *Attorney, Agent, or Firm* — LEYDIG, VOIT & MAYER, LTD.

(57) ABSTRACT

An on-load tap-changer uninterruptedly switches between winding taps of a tap-changing transformer. The on-load tap-changer has: a diverter switch that switches over from a first to a second fixed contact; and a selector that powerlessly preselects the fixed contacts and has a first and second selector arm that are actuated independently and contact each of the fixed contacts. The diverter switch has: a main path with a mechanical switching element that connects the first selector arm to a load take-off lead; a first auxiliary path with a first semiconductor switching element that is parallel to the main path and connects the first selector arm to the load take-off lead, and a second auxiliary path with a second semiconductor switching element that connect the second selector arm to the load take-off lead.

9 Claims, 6 Drawing Sheets

(58) Field of Classification Search
CPC . G05F 1/14; G05F 1/147; G05F 1/153; G05F 1/16; G05F 1/20; G05F 1/22; G05F 1/24; G05F 1/247; G05F 1/253; G05F 1/26; G05F 1/30; H01H 9/0005; H01H 9/0016; H01H 9/0027; H01H 9/0033; H02H 7/055; H02J 3/1878
See application file for complete search history.

(56) References Cited

U.S. PATENT DOCUMENTS

| | | | | |
|---|---|---|---|---|
| 2012/0313594 | A1* | 12/2012 | Brueckl | H01H 9/0027 323/258 |
| 2017/0062146 | A1* | 3/2017 | Hammer | H01H 9/0016 |
| 2018/0069492 | A1* | 3/2018 | Bieringer | H02K 3/04 |

FOREIGN PATENT DOCUMENTS

| | | | |
|---|---|---|---|
| WO | WO 9848432 | A1 | 10/1998 |
| WO | WO 0122447 | A1 | 3/2001 |

* cited by examiner

ON-LOAD TAP CHANGER AND METHOD FOR ACTUATING AN ON-LOAD TAP CHANGER

CROSS REFERENCE TO RELATED APPLICATIONS

This application is a U.S. National Phase application under 35 U.S.C. § 371 of International Application No. PCT/EP2021/072170, filed on Aug. 9, 2021, and claims benefit to German Patent Application No. DE 10 2020 123 455.4, filed on Sep. 9, 2020. The International Application was published in German on Mar. 17, 2022 as WO 2022/053239 A1 under PCT Article 21(2).

FIELD

The present disclosure relates to an on-load tap-changer for uninterrupted switching between winding taps of a tap-changing transformer under load, and to a method for actuating such an on-load tap-changer.

BACKGROUND

On-load tap-changers are used for uninterrupted switching between winding taps of a transformer. In on-load tap-changers that are based on the high-speed resistor switching principle, the circulating current that flows during the intermediately simultaneous contacting of the currently connected tap contact and the preselected new tap contact in the event of switching is limited by ohmic resistors, and thereby, ensures an uninterrupted change in the transmission ratio of the transformer. The ohmic resistor has to be designed depending on the specific circuit topology, the individual operating conditions as well as the load current and the step voltage, that is to say in particular in accordance with the respective application of the on-load tap-changer. Here, the voltage that is present between the currently connected tap contact and the preselected tap contact of the on-load tap-changer is referred to as the step voltage. On the one hand, this resistor design is complex and, on the other hand, it also affects the entire structural design of the tap-changer. Depending on the application, a different number and dimensioning of resistors is required here. The design of the resistance value therefore has an effect on the installation space required for the resistors and thus on the structural design of the other tap-changer components.

SUMMARY

In an embodiment, the present disclosure provides an on-load tap-changer that uninterruptedly switches between winding taps of a tap-changing transformer. The on-load tap-changer has: a diverter switch configured to perform a switchover from a first fixed contact to a second fixed contact of the on-load tap-changer; and a selector configured to powerlessly preselect fixed contacts, the fixed contacts being the first fixed contact and the second fixed contact, the selector having a first selector arm and a second selector arm which are configured to be actuated independently of one another and configured to contact each of the fixed contacts. The diverter switch has, for performing the switchover: a main path with a mechanical switching element, the main path being configured to connect the first selector arm to a load take-off lead via the mechanical switching element, a first auxiliary path with a first semiconductor switching element, the first auxiliary path being parallel to the main path and configured to connect the first selector arm to the load take-off lead, and a second auxiliary path with a second semiconductor switching element, the second auxiliary path being configured to connect the second selector arm to the load take-off lead.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 3*d'* to 3*f'* show a further exemplary switching sequence of the on-load tap-changer from FIG. 2.

DETAILED DESCRIPTION

Figure 1:
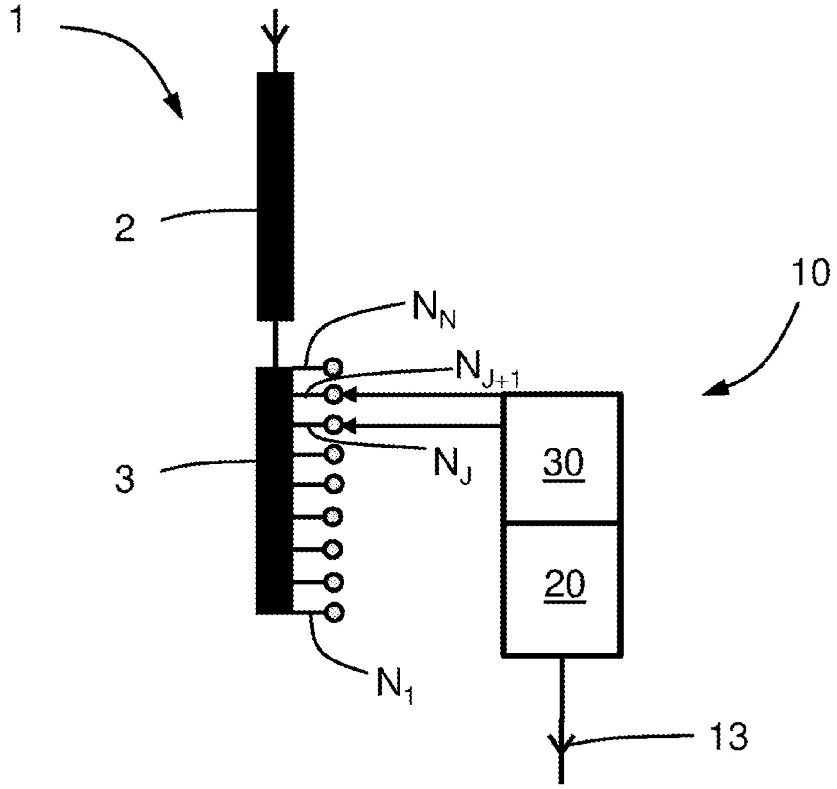
Fig. 1 Prior art
FIG. 1 shows a schematic representation of an exemplary embodiment of an on-load tap-changer.

Aspects of the present disclosure specify an improved concept for a tap-changer that can be adapted more easily to different applications.

Aspects of the improved concept are based on the idea of using semiconductor switching elements for diverter switch operation and completely dispensing with ohmic resistors. This also eliminates the complex design of the resistors and the on-load tap-changer can thus be used in one and the same design in a selected power range up to a maximum load current and a maximum step voltage.

In accordance with a first aspect of the improved concept, an on-load tap-changer for uninterrupted switching between winding taps of a tap-changing transformer is provided. The on-load tap-changer comprises a diverter switch for performing a switchover from a first fixed contact to a second fixed contact of the on-load tap-changer and a selector for powerlessly preselecting the fixed contacts. For preselection, the selector comprises a first selector arm and a second selector arm which can each be actuated independently of one another and can contact each of the fixed contacts. Each fixed contact is electrically connected to a winding tap of the tap-changing transformer. The total number of fixed contacts is dependent on the number of winding taps.

The diverter switch has a total of three paths with switching elements for performing the switchover: a main path with a mechanical switching element, which main path can connect the first selector arm to a load take-off lead via the mechanical switching element, a first auxiliary path with a first semiconductor switching element, which first auxiliary path is formed parallel to the main path and can connect the first selector arm to the load take-off lead, and a second auxiliary path with a second semiconductor switching element, which second auxiliary path can connect the second selector arm to the load take-off lead.

The on-load tap-changer, according to an aspect, does not contain an ohmic resistor as a transition resistor, which requires a complex design and can therefore be used in one and the same design in a selected power range up to a maximum load current and a maximum step voltage.

The first and the second semiconductor switching element are preferably designed as insulated gate bipolar transistor (IGBT) switching elements.

According to a preferred embodiment, a varistor is arranged parallel to the first and the second auxiliary path.

According to at least one further embodiment, the on-load tap-changer can assume two stationary positions in which both selector arms are on the same fixed contact: a first stationary position, in which the first and the second selector arm contact the first fixed contact and the first selector arm is connected to the load take-off lead via the main path, and a second stationary position, in which the first and the second selector arm contact the second fixed contact and the first selector arm is connected to the load take-off lead via the main path.

Each fixed contact preferably has a first contact face, which can be contacted by the first selector arm, and a second contact face, which can be contacted by the second selector arm.

According to at least one embodiment, the mechanical switching element in the main path is designed as a permanent main contact or as a circuit breaker.

In accordance with a second aspect of the improved concept, a method for actuating an on-load tap-changer which is formed in accordance with the first aspect of the improved concept is provided.

With regard to the method, reference is analogously made to the above explanations, preferred features and/or advantages, as has already been explained in relation to the first aspect of the improved concept or one of the associated, advantageous embodiments.

The method comprises, for switching over from a first fixed contact to a second fixed contact, i.e. in a first switching direction of the on-load tap-changer, the steps of moving a first semiconductor switching element to the closed position, switching over a second selector arm to the second fixed contact and opening a mechanical switching element, actuating the first semiconductor switching element and the second semiconductor switching element in such a way that a load current is switched over from the first fixed contact to the second fixed contact, switching over a first selector arm to the second fixed contact, closing the mechanical switching element, moving the second semiconductor switching element to the open position.

According to one embodiment, the first semiconductor switching element and the second semiconductor switching element are actuated in what is known as "intermittent" operation. Specifically, this means that initially the first semiconductor switching element is moved to the open position and then the load current flows via a varistor arranged parallel to the first semiconductor switching element. Thereafter, the second semiconductor switching element is moved to the closed position and the load current is thus switched over to the second fixed contact. The second semiconductor switching element is moved to the closed position after a specified period in a range of, for example, 2 μs to 10 μs, preferably after 5 μs. Alternatively, provision can be made for the second semiconductor switching element to be moved to the closed position as soon as it has been detected that the first semiconductor switching element has been successfully moved to the open position.

According to a further embodiment, the first semiconductor switching element and the second semiconductor switching element are actuated in what is known as "overlapping" operation. Specifically, this means that initially the second semiconductor switching element is moved to the closed position and then a circulating current flows. The increase in the circulating current is limited by the inductance of the step, i.e. the part of the tap winding of the tap-changing transformer that is located between the first and the second fixed contact. The second semiconductor switching element is preferably moved to the closed position at the zero crossing of the step voltage. Thereafter, the first semiconductor switching element is moved to the open position and the load current is thus switched over to the second fixed contact. The first semiconductor switching element is moved to the open position after a specified period in a range of, for example, 2 μs to 10 μs, preferably after 5 μs. Alternatively, provision can be made for the first semiconductor switching element to be moved to the open position as soon as it has been detected that the second semiconductor switching element has been successfully moved to the closed position.

According to a preferred embodiment, the method for switching over from the second fixed contact to the first fixed contact, i.e. in a second switching direction of the on-load tap-changer, comprises the steps of:

moving the second semiconductor switching element to the closed position, opening the mechanical switching element, switching over the first selector arm to the first fixed contact, actuating the first semiconductor switching element and the second semiconductor switching element in such a way that the load current is switched over from the second fixed contact to the first fixed contact, closing the mechanical switching element, moving the first semiconductor switching element to the open position and switching over the second selector arm to the first fixed contact.

According to one embodiment, the first semiconductor switching element and the second semiconductor switching element are actuated in what is known as "intermittent" operation. Specifically, this means that initially the second semiconductor switching element is moved to the open position and then the load current flows via a varistor arranged parallel to the second semiconductor switching element. Thereafter, the first semiconductor switching element is moved to the closed position and the load current is thus switched over to the first fixed contact. The first semiconductor switching element is moved to the closed position after a specified period in a range of, for example, 2 μs to 10 μs, preferably after 5 μs. Alternatively, provision can be made for the first semiconductor switching element to be moved to the closed position as soon as it has been detected that the second semiconductor switching element has been successfully moved to the open position.

According to a further embodiment, the first semiconductor switching element and the second semiconductor switching element are actuated in what is known as "overlapping" operation. Specifically, this means that initially the first semiconductor switching element is moved to the closed position and then a circulating current flows. The increase in the circulating current is also limited here by the inductance of the step. The first semiconductor switching element is likewise preferably moved to the closed position at the zero crossing of the step voltage. Thereafter, the second semiconductor switching element is moved to the open position and the load current is thus switched over to the first fixed contact. The second semiconductor switching element is moved to the open position after a specified period in a range of, for example, 2 μs to 10 μs, preferably after 5 μs.

Alternatively, provision can be made for the second semiconductor switching element to be moved to the open position as soon as it has been detected that the first semiconductor switching element has been successfully moved to the closed position.

Accordingly, a switchover between two adjacent fixed contacts, i.e. the actuation of the individual switching elements, takes place in the second switching direction in exactly the opposite order as in the first switching direction.

Further embodiments and implementations of the method are directly evident from the various embodiments of the tap-changer, and vice versa. In particular, individual components or a plurality of the components and/or assemblies described in relation to the tap-changer can be implemented to carry out the method accordingly.

In the following, the present disclosure is explained in detail on the basis of exemplary embodiments with reference to the drawings. Components which are identical or functionally identical or which have an identical effect may be provided with identical reference signs. Identical components or components with an identical function are in some cases explained only in relation to the figure in which they first appear. The explanation is not necessarily repeated in the subsequent figures.

The figures merely illustrate exemplary embodiments of the present disclosure without, however, limiting the present disclosure to the illustrated exemplary embodiments.

FIG. 1 schematically shows an exemplary embodiment of an on-load tap-changer 10 for a tap-changing transformer 1. The tap-changing transformer 1 has a main winding 2 and a tap winding 3 with different winding taps $N_1, \ldots, N_J, \ldots, N_N$ which are connected and disconnected by the on-load tap-changer 10. For this purpose, the on-load tap-changer 10 comprises a selector 30 which can contact the different winding taps $N_1, \ldots, N_J, \ldots, N_N$ of the tap winding 3 by means of two movable selector contacts, and a diverter switch 20 which carries out the actual diverter switch operation from the currently connected tap winding to the new, preselected winding tap. The load current flows from the currently connected winding tap $N_J$ or $N_{J+1}$ to a load take-off lead 13 via the relevant selector contact and the diverter switch 20.

Figure 2:
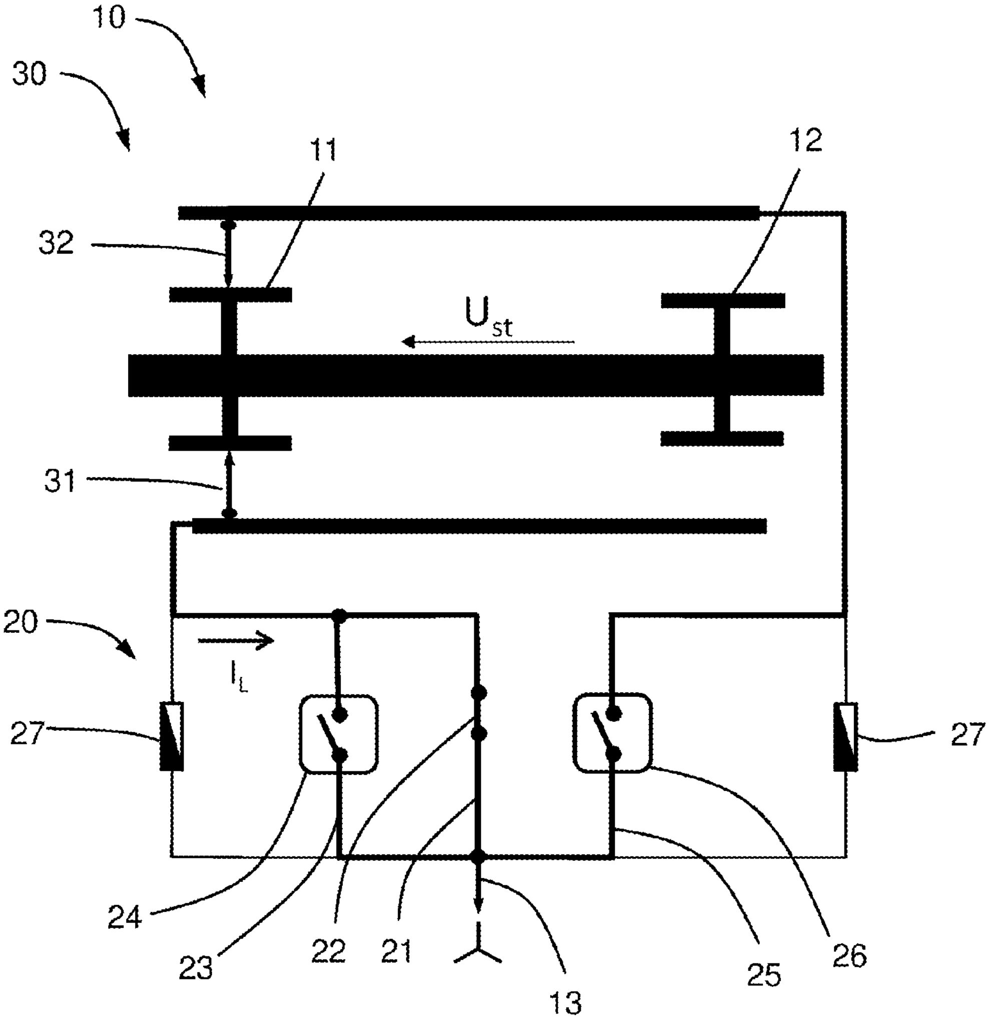
FIG. 2 shows a schematic representation of an exemplary embodiment of an on-load tap-changer according to an aspect of the improved concept.

FIG. 2 shows a schematic representation of an exemplary embodiment of an on-load tap-changer according to the improved concept.

According to the improved concept, the on-load tap-changer 10 comprises at least one first fixed contact 11 and one second fixed contact 12 which can each be connected to a winding tap of the tap winding 3 of the tap-changing transformer 1. The total number of fixed contacts is dependent on the number of winding taps. Each fixed contact 11, 12 has a first contact face and a second contact face. Furthermore, the on-load tap-changer 10 comprises a selector 30 having a first selector arm 31 and a second selector arm 32 which can be actuated independently of one another and can contact each of the fixed contacts. In this case, the first movable selector arm 31 can contact the first contact faces of the fixed contacts 11, 12, but not the second contact faces. Accordingly, the second movable selector arm 32 can contact the second contact faces of the fixed contacts 11, 12, but not the first contact faces. FIG. 2 shows a schematic diagram of an exemplary embodiment of the on-load tap-changer; in particular, the arrangement of the contact faces opposite one another is not absolutely necessary.

The on-load tap-changer 10 furthermore comprises a diverter switch 20 for carrying out the actual diverter switch operation between the preselected fixed contacts 11, 12. The diverter switch 20 has a total of three current paths: a main path 21 with a mechanical switching element 22, which main path can connect the first selector arm 31 to the load take-off lead 13, a first auxiliary path 23 with a first semiconductor switching element 24, which first auxiliary path is arranged parallel to the main path 21 and can connect the first selector arm 31 to the load take-off lead 13, and a second auxiliary path 25 with a second semiconductor switching element 26, which second auxiliary path can connect the second selector arm 32 to the load take-off lead 13.

In the illustration in FIG. 2, the on-load tap-changer 10 is in a stationary position. The first and the second selector arm 31, 32 are both located on the first fixed contact 11. The load current $I_L$ flows from the contacted fixed contact 11 to the load take-off lead 13 via the first selector arm 31, the main path 21 and the closed mechanical switching element 22. The two semiconductor switching elements 24 and 26 are moved to the open position.

FIGS. 3*a* to 3*j* show an exemplary switching sequence of the on-load tap-changer from FIG. 2.

Figure 3A:
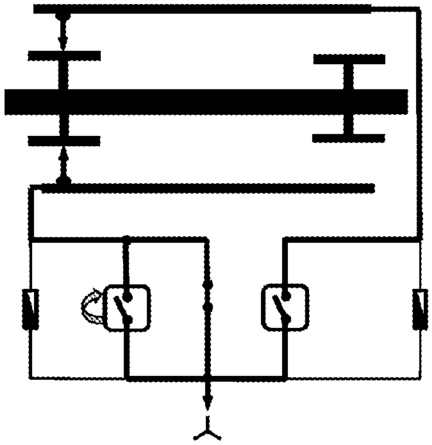
FIGS. 3*a* to 3*j* show an exemplary switching sequence of the on-load tap-changer from FIG. 2.
Figure 3B:
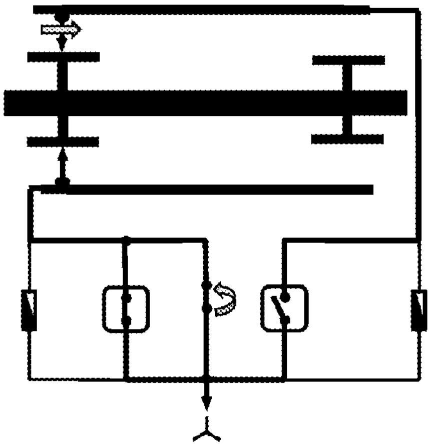

After a switching command for switching over from the first fixed contact 11 to the second fixed contact 12, the first semiconductor switching element is moved to the closed position in a first step (FIG. 3*a*).

Figure 3C:
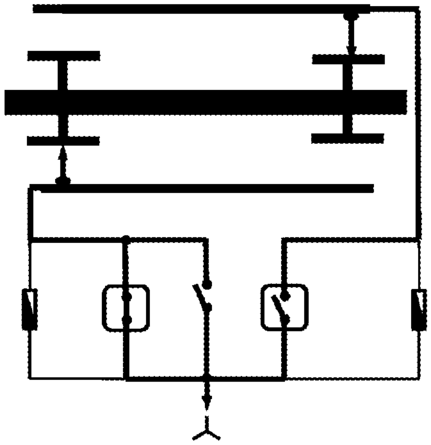

In the next step (FIG. 3*b*), the second selector arm 32, which is de-energized, is moved from the first fixed contact 11 to the second fixed contact 12, and the mechanical switching element 22 is opened. The state shown in FIG. 3*c* is reached, in which the load current $I_L$ flows via the first auxiliary path 23 and the activated first semiconductor switching element 24.

Figure 3D:
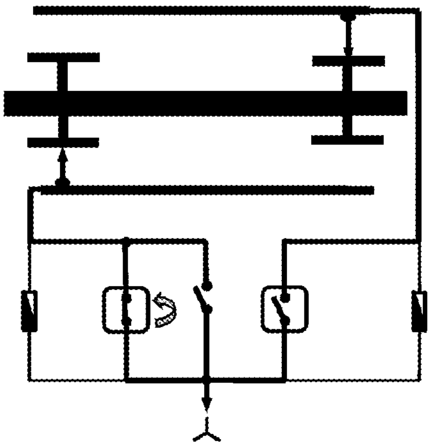

In line with what is known as the "intermittent" mode of operation, the first semiconductor switching element 24 is then moved to the open position, preferably at the zero crossing of the current (FIG. 3*d*). The course of the current over time can be detected by means of a current sensor, which is arranged in the current path of the take-off lead 13.

Figure 3E:
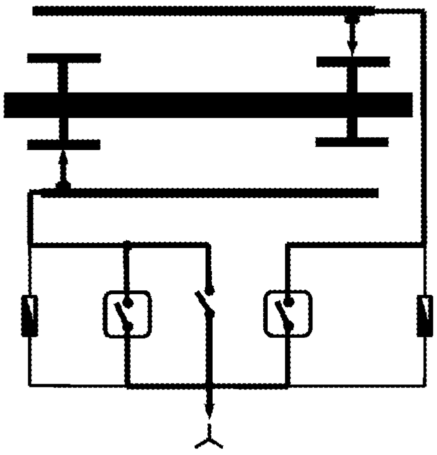

When the first semiconductor switching element 24 is moved to the open position, the load current $I_L$ passes to the varistor 27 arranged parallel thereto (FIG. 3*e*).

Figure 3F:
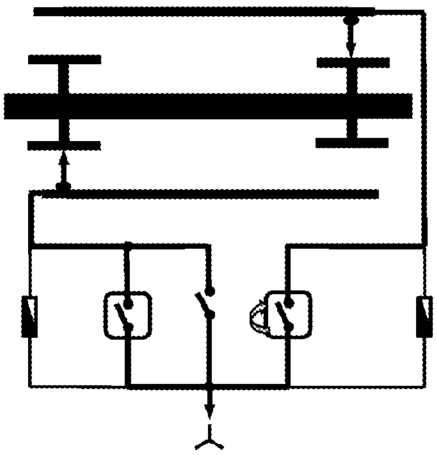

In the next step, shown in FIG. 3*f*, the second semiconductor switching element 26 is moved to the closed position after a fixed period of, for example, 5 μs. Alternatively, the second semiconductor switching element can be moved to the closed position as soon as it has been detected that the first semiconductor switching element has been successfully moved to the open position.

Figure 3G:
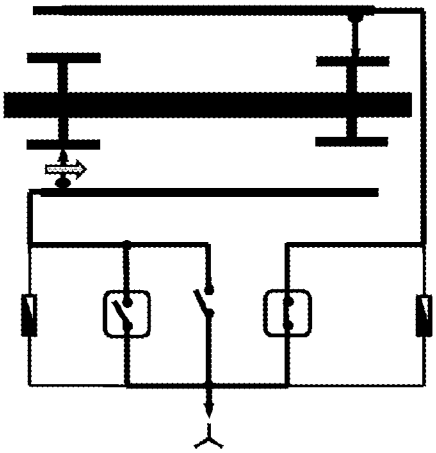
Figure 3H:
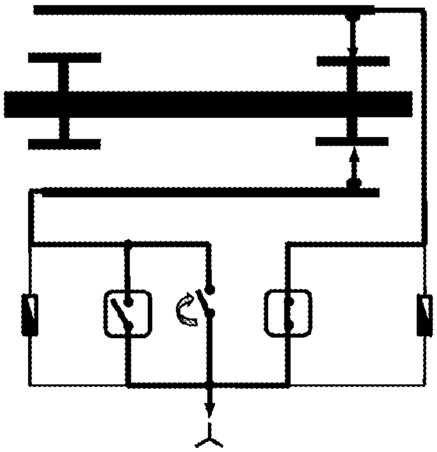
Figure 3I:
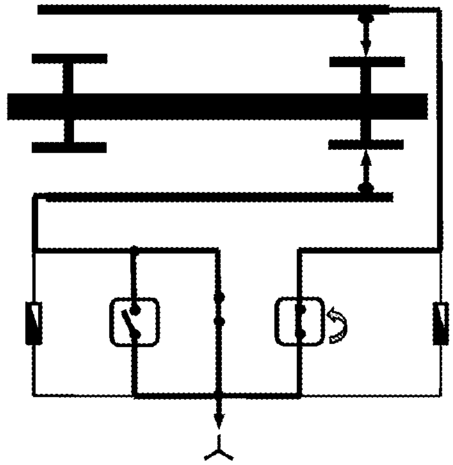

The load current $I_L$ is thus switched over to the second fixed contact 12 and flows via the second auxiliary path 25 and the activated second semiconductor switching element 26 (FIG. 3*g*).

The first selector arm 31, which is now de-energized, is then switched over to the second fixed contact 12, as indicated by an arrow in FIG. 3*g*.

In the next step (FIG. 3*h*), the mechanical switching element 22 is closed again and thereafter the second semiconductor switching element 26 is moved to the open position.

Figure 3J:
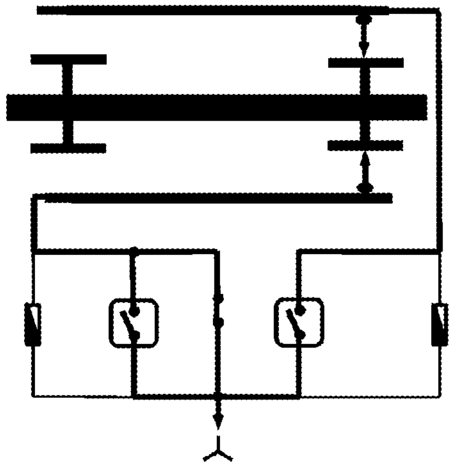
Figure 3D:
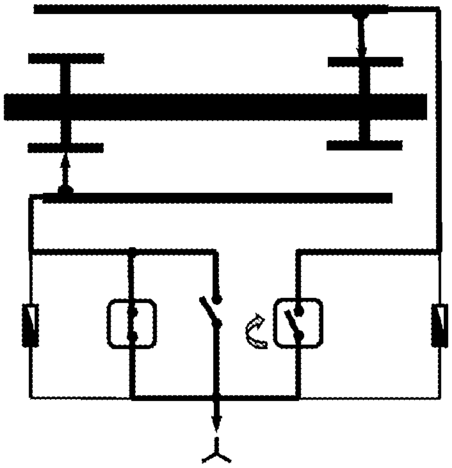
Figure 3E:
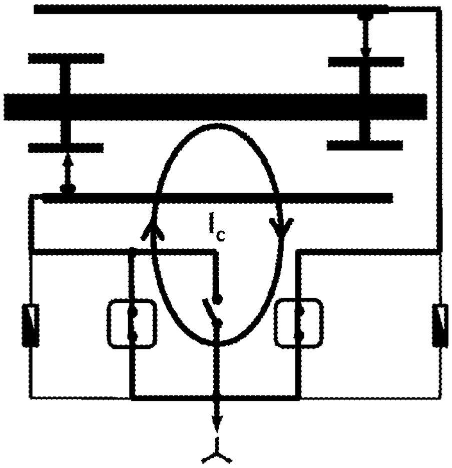
Figure 3F:
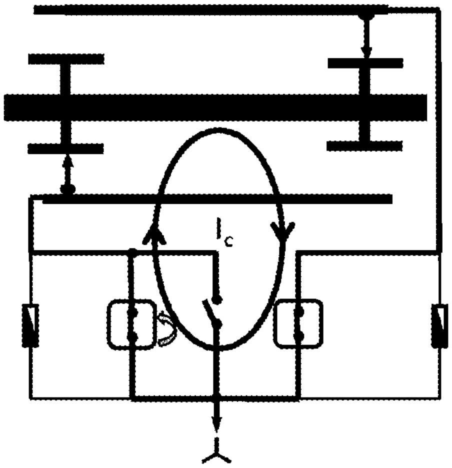

The on-load tap-changer 10 has now reached the second stationary position, which is shown in FIG. 3*j*. When the mechanical switching element 22 is closed, the load current $I_L$ passes back to the main path 21. The first and the second selector arm 31, 32 are both located on the second fixed contact 12 and the load current $I_L$ now flows from the second fixed contact 12 to the load take-off lead 13 via the first selector arm 31 and the main path 21 with the closed mechanical switching element 22. This completes the diverter switch operation to the second fixed contact 12.

If the tap-changer 10 is actuated in the "overlapping" mode of operation instead of in the "intermittent" mode of operation, the second semiconductor switching element 26 is moved to the closed position after the step shown in FIG. 3*c*, so that both semiconductor switching elements 24 and 26 are now moved to the closed position (FIG. 3*d*').

A circulating current IC then flows from the first selector arm 31, which is still in contact with the first fixed contact 11, to the second selector arm 32, which is already on the second fixed contact 12, via the first auxiliary path 23 and the second auxiliary path 25, and from there back to the first selector arm 31 via that part of the tap winding 3 situated between the first fixed contact 11 and the second fixed contact 12 (FIG. 3*e*'). The increase in the circulating current is limited by the inductance of the step, i.e. the part of the tap winding 3 of the tap-changing transformer 1 that is located between the first fixed contact 11 and the second fixed contact 12.

In the next step (3*f*'), the first semiconductor switching element 24 is then moved to the open position. The load current $I_L$ is thus switched over to the second fixed contact 12 and flows via the second auxiliary path 25 and the still activated second semiconductor switching element 26 (FIG. 3*g*). From here, the "overlapping" operation takes place again in the same way as the "intermittent" operation of the on-load tap-changer (according to FIGS. 3*g* to 3*j*).

A switchover from the second fixed contact 12 to the first fixed contact 11 takes place in exactly the reverse order, that is, according to FIGS. 3*j* to 3*a*.

It is assumed that the present disclosure and many of the attendant advantages thereof can be understood from the above description. Furthermore, it is clear that various changes can be made to the shape, construction and arrangement of the components without departing from the disclosed subject matter or without sacrificing all material advantages. The embodiment described is merely explanatory and such changes are intended to be covered by the following claims. Furthermore, it is understood that the invention of the present disclosure is defined by the following claims.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 Tap-changing transformer
2 Main winding
3 Tap winding
10 On-load tap-changer
11 First fixed contact
12 Second fixed contact
13 Load take-off lead
20 Diverter switch
21 Main path
22 Mechanical switching element
23 First auxiliary path
24 First semiconductor switching element
25 Second auxiliary path
26 Second semiconductor switching element
27 Varistor
30 Selector
31 First selector arm
32 Second selector arm
($N_1$, . . . , $N_J$, . . . , $N_N$) Winding taps

The invention claimed is:

1. An on-load tap-changer for uninterrupted switching between winding taps of a tap-changing transformer, the on-load tap-changer comprising:

a diverter switch configured to perform a switchover from a first fixed contact to a second fixed contact of the on-load tap-changer; and a selector configured to powerlessly preselect fixed contacts, the fixed contacts being the first fixed contact and the second fixed contact, the selector comprising a first selector arm and a second selector arm which are configured to be actuated independently of one another and configured to contact each of the fixed contacts, wherein the diverter switch comprises, for performing the switchover:

a main path comprising a mechanical switching element, the main path being configured to connect the first selector arm to a load take-off lead via the mechanical switching element, a first auxiliary path comprising a first semiconductor switching element, the first auxiliary path being parallel to the main path and configured to connect the first selector arm to the load take-off lead, and a second auxiliary path comprising a second semiconductor switching element, the second auxiliary path being configured to connect the second selector arm to the load take-off lead, wherein the on-load tap-changer is configured to selectively assume:

a first stationary position, in which the first selector arm and the second selector arm contact the first fixed contact and the first selector arm is connected to the load take-off lead via the main path, and a second stationary position, in which the first selector arm and the second selector arm contact the second fixed contact and the first selector arm is connected to the load take-off lead via the main path.

2. The on-load tap-changer as claimed in claim 1, further comprising a varistor parallel to the first auxiliary path and the second auxiliary path.

3. The on-load tap-changer as claimed in claim 1, wherein the mechanical switching element is a permanent main contact or as a circuit breaker.

4. A method for actuating an on-load tap-changer, the on-load tap-changer comprising a diverter switch configured to perform a switchover from a first fixed contact to a second fixed contact of the on-load tap-changer; and a selector configured to powerlessly preselect fixed contacts, the fixed contacts being the first fixed contact and the second fixed contact, the selector comprising a first selector arm and a second selector arm which are configured to be actuated independently of one another and configured to contact each of the fixed contacts, the diverter switch comprising, for performing the switchover, a main path comprising a mechanical switching element, the main path being configured to connect the first selector arm to a load take-off lead via the mechanical switching element, a first auxiliary path comprising a first semiconductor switching element, the first auxiliary path being parallel to the main path and configured to connect the first selector arm to the load take-off lead, and a second auxiliary path comprising a second semiconductor switching element, the second auxiliary path being configured to connect the second selector arm to the load take-off lead, the method comprising:

switching over from a first fixed contact to a second fixed contact by executing a switchover operation comprising:

closing the first semiconductor switching element, switching over the second selector arm to the second fixed contact and opening the mechanical switching element, actuating the first semiconductor switching element and the second semiconductor switching element in such a way that a load current is switched over from the first fixed contact to the second fixed contact, switching over the first selector arm to the second fixed contact, closing the mechanical switching element, and opening the second semiconductor switching element; and selectively assuming:

a first stationary position, in which the first selector arm and the second selector arm contact the first fixed contact and the first selector arm is connected to the load take-off lead via the main path, and a second stationary position, in which the first selector arm and the second selector arm contact the second fixed contact and the first selector arm is connected to the load take-off lead via the main path.

5. The method as claimed in claim 4, wherein the first semiconductor switching element and the second semiconductor switching element are actuated in such a way that initially the first semiconductor switching element is switched to the open position and then the load current flows via a varistor arranged parallel to the first semiconductor switching element, and thereafter the second semiconductor switching element is switched to the closed position.

6. The method as claimed in claim 4, wherein the first semiconductor switching element and the second semiconductor switching element are actuated in such a way that:

initially the second semiconductor switching element is switched to the closed position and then a circulating current flows, and thereafter the first semiconductor switching element is switched to the open position.

7. The method as claimed in claim 4, wherein the first semiconductor switching element and the second semiconductor switching element are switched to the open position at a zero crossing of a current.

8. The method as claimed in claim 4, wherein the first semiconductor switching element and the second semiconductor switching element are switched to the closed position at a zero crossing of a step voltage.

9. The method as claimed in claim 4, the method further comprising switching over from the second fixed contact to the first fixed contact by performing a second switchover operation comprising:

closing the second semiconductor switching element;

opening the mechanical switching element;

switching over the first selector arm to the first fixed contact;

actuating the first semiconductor switching element and the second semiconductor switching element in such a way that the load current is switched over from the second fixed contact to the first fixed contact;

switching over the second selector arm to the second first contact and closing the mechanical switching element; and opening the first semiconductor switching element.

* * * * *